United States Patent
Roe et al.

(10) Patent No.: US 10,097,809 B2
(45) Date of Patent: Oct. 9, 2018

(54) SYSTEMS AND METHODS FOR ADJUSTING DISPLAY SETTINGS TO REDUCE EYE STRAIN OF MULTIPLE VIEWERS

(71) Applicant: Rovi Guides, Inc., San Carlos, CA (US)

(72) Inventors: Glen E. Roe, Simi Valley, CA (US); Michael McCarty, Agoura Hills, CA (US)

(73) Assignee: Rovi Guides, Inc., San Jose, CA (US)

( * ) Notice: Subject to any disclaimer, the term of this patent is extended or adjusted under 35 U.S.C. 154(b) by 151 days.

(21) Appl. No.: 15/349,683

(22) Filed: Nov. 11, 2016

(65) Prior Publication Data

US 2018/0139434 A1    May 17, 2018

(51) Int. Cl.
| | |
|---|---|
| H04N 13/144 | (2018.01) |
| H04N 13/15 | (2018.01) |
| H04N 13/167 | (2018.01) |
| H04N 13/00 | (2018.01) |
| G06F 3/01 | (2006.01) |
| H04N 21/485 | (2011.01) |
| H04N 21/466 | (2011.01) |

(52) U.S. Cl.
CPC .......... *H04N 13/144* (2018.05); *G06F 3/013* (2013.01); *H04N 13/0033* (2013.01); *H04N 13/0037* (2013.01); *H04N 13/0051* (2013.01); *H04N 13/15* (2018.05); *H04N 13/167* (2018.05); *H04N 21/4661* (2013.01); *H04N 21/4858* (2013.01)

(58) Field of Classification Search
None
See application file for complete search history.

(56) References Cited

U.S. PATENT DOCUMENTS

| | | | |
|---|---|---|---|
| 6,239,794 | B1 | 5/2001 | Yuen et al. |
| 6,564,378 | B1 | 5/2003 | Satterfield et al. |
| 7,165,098 | B1 | 1/2007 | Boyer et al. |
| 7,761,892 | B2 | 7/2010 | Ellis et al. |
| 8,046,801 | B2 | 10/2011 | Ellis et al. |
| 2002/0174430 | A1 | 11/2002 | Ellis et al. |
| 2005/0190180 | A1 | 9/2005 | Jin et al. |

(Continued)

FOREIGN PATENT DOCUMENTS

| | | |
|---|---|---|
| WO | WO 2015/161495 | 10/2015 |
| WO | WO 2016/064366 | 4/2016 |

*Primary Examiner* — Mohammad J Rahman
(74) *Attorney, Agent, or Firm* — Haley Guiliano LLP

(57) ABSTRACT

Methods and systems for reducing eye strain for multiple users are described herein. The method includes calculating, for each viewer, a metric representing a degree of eye strain of the viewer based on eye activity of the first viewer. The method further involves determining whether each metric is within a range indicating an acceptable degree of eye strain for each viewer. If a metric is not within the range indicating an acceptable degree of eye strain, then, for each viewer, a subset of display settings that is known to cause the metric to be within the viewer's range is identified. The method further involves identifying an additional subset of display settings, where the additional subset is made up of display settings that are also in each viewer's subset. A display setting is selected from this additional subset, and the display is generated according to the selected display setting.

20 Claims, 6 Drawing Sheets

(56) References Cited

U.S. PATENT DOCUMENTS

| | | |
|---|---|---|
| 2005/0251827 A1 | 11/2005 | Ellis et al. |
| 2007/0139362 A1* | 6/2007 | Colton ...................... G06F 3/01 |
| | | 345/156 |
| 2007/0159470 A1 | 7/2007 | Jeng et al. |
| 2010/0153885 A1 | 6/2010 | Yates |
| 2011/0181541 A1 | 7/2011 | Kuo |
| 2014/0002344 A1 | 1/2014 | Pai |
| 2017/0344209 A1* | 11/2017 | Gordon ................. G06F 3/0484 |
| 2018/0046423 A1* | 2/2018 | Abraham .............. G06F 3/1423 |

* cited by examiner

| 108 | Friday 12:44pm March 31, 2006 | | | 112 |
|---|---|---|---|---|
| 110 | The Big Bang Theory 2 FOX<br>7-7:30 pm TV-PG<br>"The Scavenger Vortex",<br>Repeat, (2013). | | 104 | |
| 102 | Sunday | 7:00 pm | 7:30 pm | 8:00 pm |
| | 2 FOX | The Big Bang T | The Big Bang T | World Series: Ga |
| | 3 ABC | Godzilla 106 | | |
| | 4 CBS | 60 Minutes | | NCIS |
| | 5 NBC | World Series: Game 5: Indians at Cubs | | |
| | 6 TBS | Star Wars: A New Hope | | |
| | 7 FX | The Twilight Saga: Breaking Dawn – Part 2 | | |

| 208 | Friday 12:44pm March 31, 2006 | | 212 |
|---|---|---|---|
| 210 | The Big Bang Theory 2 FOX<br>7-7:30 pm TV-PG<br>"The Scavenger Vortex",<br>Repeat, (2013). | 204 | |
| 202 | Sunday | 7:00 pm | 7:30 pm |
| | 2 FOX | The Big Bang T | The Big Bang T |
| | 3 ABC | Godzilla | 206 |
| | 4 CBS | 60 Minutes | |

SYSTEMS AND METHODS FOR ADJUSTING DISPLAY SETTINGS TO REDUCE EYE STRAIN OF MULTIPLE VIEWERS

BACKGROUND

Eye strain can make viewing display screens difficult or painful for users. Users may experience eye strain for various reasons, such as poor vision, fatigue, or viewing a display screen for an extended period of time. Different users may experience different levels of eye strain based on their own vision, level of fatigue, or length of time viewing a display screen, among other factors. Current display screens and media guidance applications may allow users to adjust various aspects of a display, including brightness, contrast, or font size. However, users must manually adjust these settings, which can be time consuming. Moreover, it may be challenging to find a set of display settings that reduces eye strain for two or more users. For example, one user's eye strain may be improved by increasing the contrast, while the other user may have poorer vision and need to increase the font size to sufficiently reduce eye strain. Adjusting the display settings to improve eye strain for one user may not improve eye strain for the other. Alternatively, the users may attempt to manually adjust display settings to improve eye strain for both users, but this will be difficult and time consuming, especially if multiple settings must be adjusted.

SUMMARY

Methods and systems are provided herein for reducing eye strain for viewers of a display screen. When multiple users are viewing a display screen, they may experience different types and/or different levels of eye strain. To ensure a comfortable viewing experience for all users, the methods and systems provided herein determine a degree of eye strain for each user, and determine whether or not each user is experiencing an acceptable degree of eye strain. If at least one viewer is not experiencing an acceptable degree of eye strain, the methods and systems identify a display setting that will create an acceptable degree of eye strain for all viewers, and display content according to that display setting. The methods and systems described herein automatically detect that one or more users is experiencing an unacceptable degree of eye strain, determine a display setting or set of display settings that will be comfortable for all users, and adjust the display screen accordingly.

In some embodiments, methods and systems are provided herein for reducing eye strain for multiple viewers. In some embodiments, a media guidance application generates content for display according to a first display setting, and the media guidance application detects that a first viewer and a second viewer are consuming the content from a device that is displaying the content. For example, the media guidance application may be displaying a program listings display. The media guidance application may detect that two users, a mother and son, are viewing the program listings display from a television that is displaying the program listings display.

In some embodiments, the media guidance application calculates, for the first viewer, based on eye activity of the first viewer, a first metric. The first metric represents a degree of eye strain of the first viewer. For example, the media guidance application may calculate, for the mother, a first metric representing the mother's eye strain based on the mother's eye activity. For example, the mother may be near-sighted and is straining to view the content by, for example, squinting her eyes; the first metric will then represent that the mother's eyes are straining to see the content based on her eye activity.

In some embodiments, the media guidance application calculates the first metric by measuring at least one of an amount of blinking of the first viewer, a pupil diameter of the first viewer, an amount of squinting of the first viewer, an eye movement velocity of the first viewer, and a speed of pupil accommodation of the first viewer. The media guidance application may further store the amount of blinking of the first viewer, the pupil diameter of the first viewer, the amount of squinting of the first viewer, the eye movement velocity of the first viewer, and the speed of pupil accommodation of the first viewer. For example, during a first minute-long time period, the media guidance application may measure that the mother is squinting during 40% of the minute. The media guidance application may store this amount of squinting in memory.

In some embodiments, the media guidance application calculates the first metric by measuring a first eye strain factor of the first viewer during a first time period, wherein the first eye strain factor represents a first symptom of eye strain, and measuring a second eye strain factor of the first viewer during the first time period, wherein the second eye strain factor represents a second symptom of eye strain. The media guidance application may calculate the first metric based on the first eye strain factor and the second eye strain factor. For example, the first eye strain factor may be the number of times that the mother blinks during the first time period (e.g., 15 times over one minute), and the second eye strain factor may be the level of squinting (e.g., squinting during 40% of the minute). The media guidance application may then calculate the first metric for the mother based on the number of times that the viewer blinks (i.e., a blinking factor) and the amount of squinting (i.e., a squinting factor). For example, the media guidance application may first scale both the blinking factor and the squinting factor based on the severity of the symptoms, and then the media guidance application may average the two factors to calculate the first metric. For example, squinting during 40% of the minute may be 8 out of 10 on a scale of squinting severity, because it represents a fairly high amount of squinting. Blinking 15 times during one minute may be 0 out of 10 on a scale of blinking severity, because blinking 15 times over one minute is a normal amount of blinking. The first metric, which is the average of these two factors, is 4 out of 10, which may represent that the mother is straining her eyes a moderate amount.

In some embodiments, the media guidance application calculates, for the second viewer, based on eye activity of the second viewer, a second metric, wherein the second metric represents a degree of eye strain of the second viewer. The second metric may be calculated similar to how the first metric is calculated. For example, the media guidance application may calculate, for the son, a second metric representing the son's eye strain based on the son's eye activity. For example, the son may have been looking at a display screen continuously for many hours, and has eye strain due to fatigue. The second metric will then represent that the son's eyes are straining to see the content based on his eye activity. For example, the media guidance application may detect that the son's eyes are minimally squinting, and the media guidance application may detect that the son's eyes are blinking more than a normal amount, which is another symptom of eye strain. As an example, the son's squinting factor may be 2 out of 10, and his blinking factor may be 6 out of 10. The second metric may be the average of these two factors, which is 3 out of 10; this may represent that the son is experiencing some eye strain, but less than his mother.

In some embodiments, the media guidance application determines whether the first metric is within a first range indicating an acceptable amount of eye strain for the first viewer and whether the second metric is within a second range indicating acceptable eye strain for the second viewer. For example, if the media guidance application calculates the first and second metric on a scale from one to ten, the range indicating an acceptable amount of eye strain for the mother may be from one to three, and the range indicating an acceptable amount of eye strain for the son may be from zero to one. The media guidance application may determine that the first metric, representing the mother's degree of eye strain, is not within the range indicating an acceptable amount of eye strain for the mother, because four is outside of the range of one to three. The media guidance application may further determine that the second metric, representing the son's degree of eye strain, is not within the range indicating an acceptable amount of eye strain for the son, because three is outside of the range of zero to one.

In some embodiments, to determine whether the first metric is within the first range indicating an acceptable amount of eye strain for the first viewer, the media guidance application retrieves a plurality of values that indicate the first range indicating an acceptable amount of eye strain for the first viewer, compares the first metric with each of the plurality of values that indicate the first range indicating an acceptable amount of eye strain for the first viewer, and determines, based on the comparing, that the first metric is not within the first range. For example, to determine whether the first metric, representing the mother's degree of eye strain, is within the first range, the media guidance application first retrieves a plurality of values, e.g., 1 and 3, which indicate the first range indicating an acceptable amount of eye strain for the mother. The media guidance application may then compare the first metric (which was calculated to be 4) to the first of the two values (1), and determine that 4 is not less than 1, which represents the lower end of the first range. The media guidance application may then compare the first metric (4) to the second of the two values (3), and determine that 4 is greater than 3, which represents the upper end of the first range. Because the first metric (4) is greater than the upper end of the range (3), the media guidance application determines that the first metric is not within the first range.

In some embodiments, in response to determining that the first metric is not within the range indicating an acceptable amount of eye strain for the first viewer, or that the second metric is not within the range indicating an acceptable amount of eye strain for the second viewer, the media guidance application identifies, for the first viewer, a first subset of display settings that are known to cause the first metric to be within the first range and, for the second viewer, a second subset of display settings that are known to cause the second metric to be within the second range. For example, in response to determining that the first metric representing the mother's degree of eye strain is not within the range indicating an acceptable amount of eye strain for the mother, and/or that the second metric representing the son's degree of eye strain is not within the range indicating an acceptable amount of eye strain for the son, the media guidance application may determine two subsets of display settings. The first subset of display settings may be known to cause the first metric, representing the mother's degree of eye strain, to be within the first range (e.g., between 1 and 3). For example, the first subset of display settings may include a set of display settings with a larger font, so that the mother no longer must squint to see the content. The second subset of display settings may be known to cause the second metric, representing the son's degree of eye strain, to be within the second range (e.g., between 0 and 1). For example, the second subset of display settings may include a set of display settings with a lower brightness level, to reduce the eye fatigue experienced by the son.

In some embodiments, to identify the first subset of display settings that are known to cause the first metric to be within the first range, the media guidance application detects that the first viewer started consuming content from the device with a given display setting; calculates, for the first viewer, based on the eye activity of the first viewer, a starting metric that measures a degree of eye strain of the first viewer; calculates a plurality of additional metrics while the first viewer is consuming content from the device; and, in response to determining that each metric of the plurality of additional metrics is within the first range indicating an acceptable amount of eye strain for the first viewer, stores the given display setting as a display setting in the subset of display settings that are known to cause the first metric to be within the first range. For example, the media guidance may detect that the mother started consuming content from the television with a first font size. The media guidance application may calculate for the mother, based on her eye activity (e.g., blinking frequency and squinting frequency), a starting metric of 2 that measures the mother's eye strain. The media guidance application may continue to calculate additional metrics while the mother continues watching television, and may determine that each of the additional metrics is within the first range indicating an acceptable amount of eye strain for the mother. The media guidance application may store the font size as a display setting in the subset of display settings that are known to cause the first metric representing the mother's degree of eye strain to be within the first range.

In some embodiments, to identify the first subset of display settings that are known to cause the first metric to be within the first range, the media guidance application transmits a query comprising an identifier of the first viewer to a database, wherein the database associates the identifier of the first viewer to a plurality of settings that are known to cause the first metric to be within the first range. The media guidance application receives from the database one or more settings of the plurality of settings that are known to cause the first metric to be within the first range, and stores the one or more settings as the first subset of display settings. For example, the media guidance application may transmit a query that includes an identifier of the mother (e.g., a user ID used by the mother) to a database. The database associates the user ID of the mother to a plurality of settings (e.g., settings for font sizes that the mother can read, and settings for brightness that are acceptable to the mother) that are known to cause the first metric representing the mother's degree of eye strain to be within the first range representing an acceptable amount of eye strain for the mother. The media guidance application may receive from the database one or more settings of the plurality of settings (e.g., two font sizes and three brightness levels) and store these received settings as the first subset of display settings.

In some embodiments, the media guidance application identifies a third subset of display settings wherein the third subset of display settings comprises display settings that are in both the first subset and the second subset. For example, if the media guidance application has received subsets of display settings describing font sizes and brightness levels that cause the first and second metrics to be within the first and second ranges, respectively, the media guidance application may determine a third subset of display settings that includes the overlapping font sizes and brightness levels from the first and second subsets. For example, if the mother's subset of display settings includes font sizes 20 and 24 and brightness levels 1, 2, and 3, and the son's subset of display settings includes font sizes 14, 18, 20, and 24, and brightness levels 1 and 2, the third subset of display settings may include font sizes 20 and 24, and brightness levels 1 and 2.

In some embodiments, to identify the third subset of display settings, the media guidance application retrieves, from a database, the first subset of display settings and the second subset of display settings, compares each display setting in the first subset of display settings to each display setting in the second subset of display settings, and store each matching display setting in the third subset of display settings. For example, the media guidance application may retrieve from a database the first subset of display settings (e.g., font sizes 20 and 24 and brightness levels 1, 2, and 3) and the second subset of display settings (font sizes 14, 18, 20, and 24, and brightness levels 1 and 2). The media guidance application may compare each display setting in the first subset of display settings to the corresponding display settings in the second subset of display settings. For example, the media guidance application may compare the font sizes 20 and 24 to font sizes 14, 18, 20, and 24, and determine that font sizes 20 and 24 are within both the first subset and second subset. The media guidance application may similarly compare the brightness levels in the first subset and second subset and determine that brightness levels 1 and 2 are on both subsets. The media guidance application may then store the matching settings (font sizes 20 and 24 and brightness levels 1 and 2) in the third subset of display settings.

In some embodiments, the media guidance application selects a second display setting that is within the third subset. For example, if the third subset of display settings includes font sizes 20 and 24 and brightness levels 1 and 2, the media guidance application may select a display setting with font size 20 and brightness 2. In some embodiments, the media guidance application selects a setting that has been selected in the past and is known to cause the first viewer's eye strain and the second viewer's eye strain to be within the ranges indicating an acceptable amount of eye strain for the first viewer and the second viewer. For example, the media guidance application may determine that the display setting with font size 20 and brightness level 2 has been selected in the past when the mother and son were viewing the television, and that this display setting caused the mother's eye strain and the son's eye strain to be within the ranges indicating an acceptable amount of eye strain for the mother and the son.

In some embodiments, the media guidance application generates for display the content according to the second display setting. For example, the media guidance application may generate the program listings display with a font size of 20 and a brightness level of 2 for display.

In some embodiments, in response to determining that generating for display the content according to the second display setting caused the first viewer's eye strain to be within the first range and the second viewer's eye strain to be within the second range, the media guidance application associates the second settings with the combination of the first viewer and the second viewer. For example, in response to determining that generating the program listings display with a font size of 20 and a brightness level of 2 caused the mother's and the son's eye strain to return to the first and second ranges indicating acceptable degrees of eye strain for the mother and son, respectively, the media guidance application associates this font size and brightness level with the viewing combination of the mother and the son.

In some embodiments, the media guidance application detects that the first viewer started consuming content from the device and calculates, based on the eye activity of the first viewer, a historical metric that represents an acceptable degree of eye strain of the first viewer. The media guidance application further determines the first range indicating an acceptable degree of eye strain for the first viewer based on the historical metric. For example, the media guidance application may detect that the mother started watching the television and calculates, based on the mother's eye activity, a historical metric that represents an acceptable degree of eye strain for the mother based on the historical metric. For example, the media guidance application may determine that historically, an acceptable degree of eye strain for the mother may be an eye strain metric of 3, based on previous eye strain metrics measured for the mother. The media guidance application may determine the first range of 1 to 3 indicating an acceptable degree of eye strain for the mother based on the historical metric of 3.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 shows an illustrative example of a display generated by a media guidance application according to a first display setting, in accordance with some embodiments of the disclosure;

FIG. 2 shows an illustrative example of a display generated by a media guidance application according to a second display setting, in accordance with some embodiments of the disclosure;

DETAILED DESCRIPTION

Figure 3:
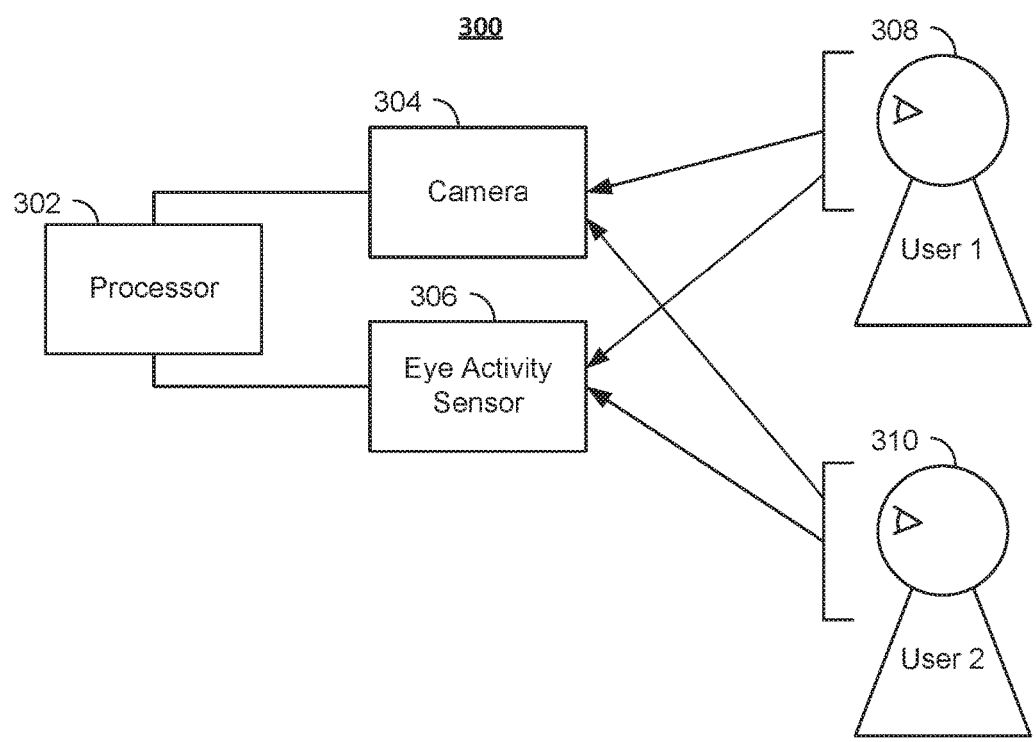
FIG. 3 shows a block diagram of an illustrative system for detecting eye strain, in accordance with some embodiments of the disclosure.

Methods and systems are provided herein for reducing eye strain for multiple viewers. When multiple users are viewing a display screen, they may experience different types and/or different levels of eye strain. As used herein, "eye strain" refers to any pain or fatigue of the eyes that may cause a viewer discomfort or may make it difficult for a user to see or focus. To ensure a comfortable viewing experience for all users, the methods and systems provided herein determine a degree of eye strain for each user, and determine whether or not each user is experiencing an acceptable degree of eye strain. If at least one viewer is not experiencing an acceptable degree of eye strain, the methods and systems identify a display setting that will create an acceptable degree of eye strain for all viewers, and display content according to that display setting. The methods and systems described herein automatically detect that one or more users is experiencing an unacceptable degree of eye strain, determine a display setting or set of display settings that will be comfortable for all users, and adjust the display screen accordingly.

In some embodiments, a media guidance application detects that a first viewer and a second viewer are consuming content from a device. The content is generated for display according to a first display setting. For example, two viewers may be viewing a program listings display on a television, and the program listings may be displayed with a first font size (e.g., font size 16). The media guidance application calculates, for the first viewer, a first metric representing a degree of eye strain of the first viewer based on eye activity of the first viewer. The media guidance application also calculates, for the second viewer, a second metric representing a degree of eye strain of the second viewer based on eye activity of the second viewer. For example, the media guidance application may calculate for both viewers a metric representing each viewer's eye strain based on how much or how often each viewer's eyes are squinting. The media guidance application determines whether the first metric is within a first range indicating an acceptable degree of eye strain for the first viewer, and whether the second metric is within a second range indicating an acceptable degree of eye strain for the second viewer. For example, the media guidance application may compare the two metrics to two respective ranges describing an acceptable amount of squinting for each viewer.

In response to determining that either the first metric is not within the first range, or that the second metric is not within the second range, the media guidance application identifies, for the first viewer, a first subset of display settings that are known to cause the first metric to be within the first range. The media guidance application also identifies, for the second viewer, a second subset of display settings that are known to cause the second metric to be within the second range. For example, if the media guidance application determines that the metric representing the amount that the first viewer is squinting (e.g., the first viewer is squinting during 30% of a given time period) is not within a first range describing an acceptable amount of squinting for the first viewer (e.g., squinting 0-10% of the time), the media guidance application may identify two subsets of display settings, such as font sizes. The first subset of font sizes (e.g., sizes 20 to 30) may cause the metric representing the amount that the first viewer is squinting to be within the first range describing an acceptable amount of squinting for the first viewer. The second subset of display settings (e.g., sizes 14 to 30) may cause the metric representing the amount that the second viewer is squinting to be within the second range describing an acceptable amount of squinting for the second viewer.

The media guidance application then identifies a third subset of display settings that includes display settings that are in both the first subset and the second subset. For example, given that the first subset includes font sizes 20 to 30 and the second subset includes font sizes 14 to 30, the media guidance application may identify font sizes 20 to 24, which includes font sizes in both the first and second subsets, as the third subset. The media guidance application selects a second display setting that is within the third subset and generates for display the content according to the second display setting. For example, if the third subset includes font sizes 20 to 24, the media guidance application may select the font size 22, which is within the third subset. Further, the media guidance application may generate for display the program listings display with font size 22.

FIG. 1 shows an illustrative example of a display generated by a media guidance application according to a first display setting, in accordance with some embodiments of the disclosure. FIG. 1 shows a display 100 generated by a media guidance application. The display includes a grid of program listings 102 that are arranged by time and channel. The program listing 104 for "The Big Bang Theory" is highlighted a highlight region. The text 106 of this highlight region is displayed with a first font size. The font size of text 106 may be determined from a default setting, a user preference, a user selection, an analysis of eye strain of one or more viewers, or by any other means. The other program listings 102 are displayed at the same font size. The display 100 further includes time and date region 108 and information region 110 for displaying additional information related to the highlighted program listing 104. The display 100 also includes video region 112, which may display media, such as an image or a video. Additional elements of display 100, and additional and alternative features that may be included in display 100, are described further with respect to FIG. 4.

In some embodiments, the media guidance application generates content, such as display 100, for display according to a first display setting. For example, the text 106 and the text of regions 108 and 110 are displayed with a font size, which is a display setting. The font size may vary between different regions or within any region, or it may be constant across the display. Additional or alternative display settings may include contrast, brightness, resolution, zoom, and color settings. The color or color scheme settings may include colors for text, lines, background regions, graphics, images, or videos. For example, the setting may specify the color(s) for text and the background of the text, or specify different colors to use based on the background color. Furthermore, the display setting may include the RBG (red-green-blue) balance, color temperature, or other settings for adjusting the color scheme or the way that colors are displayed. In some embodiments, the display setting may set or adjust coloration of the display to improve visibility for color blind viewers. The media guidance application may generate content according to one or more of these display settings or any other display settings.

The display settings may apply to any type of display generated by a media guidance application. For example, the media guidance application may provide a variety of different user interface displays for providing information to and/or receiving input from one or more viewers. The media guidance application may also display various types of media, as described further with respect to FIGS. 4-7.

In some embodiments, the media guidance application detects that a first viewer and a second viewer are consuming the content from a device that is displaying the content. For example, the media guidance application may be displaying the program listings display 100. The media guidance application may detect that two viewers, such as a mother and son, are viewing the program listings display from a television that is displaying the program listings display. The media guidance may detect that the first and second viewer are consuming the content in several ways. For example, the media guidance application may receive proximity data from devices associated with the viewers (e.g., smart phones or smart watches) identifying that the viewers are in the proximity of the display 100. As another example, the viewers may provide identifying information to the media guidance application by, e.g., signing in or selecting a user profile.

Figure 4:
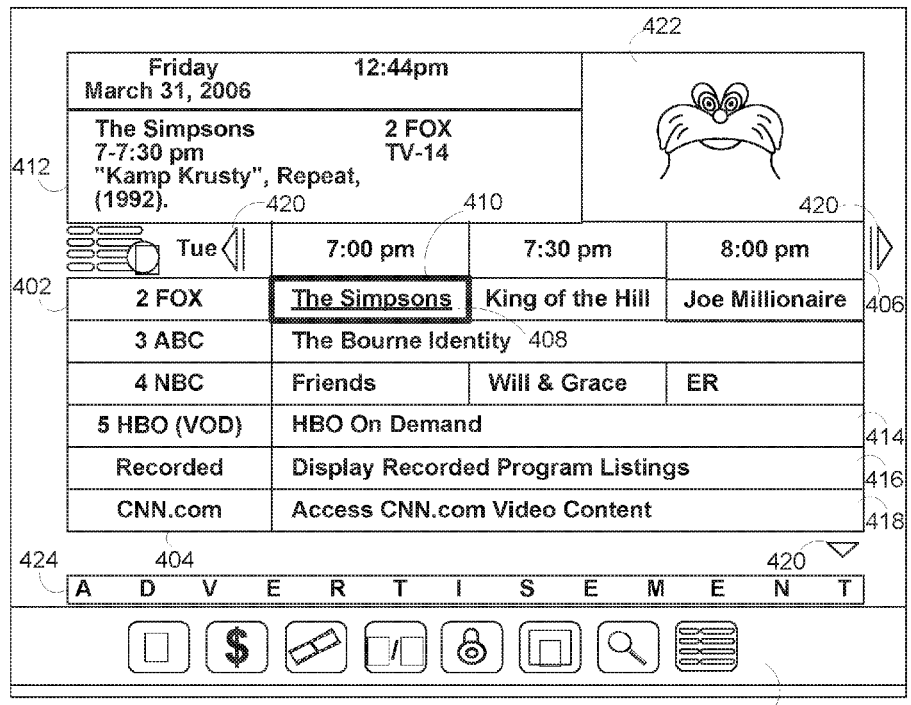
FIG. 4 shows an illustrative example of a display screen generated by a media guidance application, in accordance with some embodiments of the disclosure.

As described with respect to FIG. 4, the media guidance application may receive data from a detection module. As shown in FIG. 3, this detection module may include a camera. The media guidance may receive an identification of the viewers from the detection module, or the media guidance application may analyze data received from the detection module (e.g., an image or video captured by the camera) to identify the viewers. Although for simplicity the methods and systems are generally described with reference to two viewers, it should be understood that the media guidance application can detect more than two viewers and can adjust the display settings to alleviate eye strain for more than two viewers.

In some embodiments, the media guidance application calculates, for the first viewer, based on eye activity of the first viewer, a first metric. The first metric represents a degree of eye strain of the first viewer. For example, the media guidance application may calculate, for the mother, a first metric representing the mother's eye strain based on the mother's eye activity. The media guidance application may use one or more different types of eye activity for identifying eye strain. The eye activity may include, for example, squinting, blinking, pupil diameter, eye movement velocity, and/or speed of pupil accommodation. For example, the mother may be near-sighted and is straining to view the content by, for example, squinting her eyes; the first metric will then represent that the mother's eyes are straining to see the content based on her eye activity. As another example, the son may have been viewing a display screen for a long period of time and is blinking less as a result. Pupil diameter, eye movement velocity, and speed of pupil accommodation are found to change as a result of fatigue or visual fatigue. In a particular environmental condition, a person whose eyes are fatigued will have a smaller pupil diameter than if that person were not fatigued. Eye movement velocity, such as the speed of saccades (which are quick, simultaneous movement of the eyes while scanning), can decrease as a result of visual fatigue. Pupil accommodation is a reflex action of the pupil in which it contracts or dilates based on lighting conditions or change of focus; a slower accommodation speed can indicate visual fatigue. Any other type of eye activity that is associated with eye strain and/or eye fatigue can be monitored and used to calculate the first metric.

In some embodiments, the media guidance application calculates the first metric by measuring at least one of an amount of blinking of the first viewer, a pupil diameter of the first viewer, an amount of squinting of the first viewer, an eye movement velocity of the first viewer, and a speed of pupil accommodation of the first viewer. The media guidance application may further store the at least one of the amount of blinking of the first viewer, the pupil diameter of the first viewer, the amount of squinting of the first viewer, the eye movement velocity of the first viewer, and the speed of pupil accommodation of the first viewer. For example, during a first minute-long time period, the media guidance application may measure that the mother is squinting during 40% of the minute. The media guidance application may store this amount of squinting in memory. The media guidance application may then access this stored amount of blinking to calculate the first metric. The media guidance application may measure and store multiple factors (e.g., an amount of blinking and an amount of squinting) and calculate the first metric based on the multiple stored factors.

In some embodiments, the media guidance application calculates the first metric by measuring a first eye strain factor of the first viewer during a first time period, wherein the first eye strain factor represents a first symptom of eye strain, and measuring a second eye strain factor of the first viewer during the first time period, wherein the second eye strain factor represents a second symptom of eye strain. The media guidance application may calculate the first metric based on the first eye strain factor and the second eye strain factor. For example, the first eye strain factor may be the number of times that the mother blinks during the first time period (e.g., 15 times over one minute), and the second eye strain factor may be the level of squinting (e.g., squinting during 40% of the minute). The media guidance application may then calculate the first metric for the mother based on the number of times that the user blinks (i.e., a blinking factor) and the amount of squinting (i.e., a squinting factor). For example, the media guidance application may first scale both the blinking factor and the squinting factor based on the severity of the symptoms, and then the media guidance application may average the two factors to calculate the first metric. For example, squinting during 40% of the minute may be 8 out of 10 on a scale of squinting severity, because it represents a fairly high amount of squinting. Blinking 15 times during one minute may be 0 out of 10 on a scale of blinking severity, because blinking 15 times over one minute is a normal amount of blinking. The first metric, which is the average of these two factors, is 4 out of 10, which may represent that the mother is straining her eyes a moderate amount.

The media guidance application may calculate the first metric according to any algorithm, equation, or set of equations. For example, the media guidance application may receive data describing eye activity detected by, for example, the detection module shown in FIG. 3. The media guidance may analyze the data describing the eye activity to measure multiple eye strain factors based on the eye activity. The media guidance application may optionally scale a measurement to calculate an eye strain factor. The media guidance application may numerically combine the eye strain factors by calculating, e.g., an average of the eye strain factors, a weighted average of the eye strain factors, or some other function or formula that receives the eye strain factors as inputs and calculates the first metric. Alternatively, the media guidance application may select an eye strain factors, such as the highest scaled eye strain factor, and set the first metric equal to the selected eye strain factor.

In some embodiments, the media guidance application calculates, for the second viewer, based on eye activity of the second viewer, a second metric, wherein the second metric represents a degree of eye strain of the second viewer. The second metric may be calculated similar to how the first metric is calculated, as discussed above. For example, the media guidance application may calculate, for the son, a second metric representing the son's eye strain based on the son's eye activity. For example, the son may have been looking at a display screen continuously for many hours, and has eye strain due to fatigue. The second metric will then represent that the son's eyes are straining to see the content based on his eye activity. For example, the media guidance application may detect that the son's eyes are minimally squinting, and the media guidance application may detect that the son's eyes are blinking more than a normal amount, which is another symptom of eye strain. As an example, the son's squinting factor may be 2 out of 10, and his blinking factor may be 6 out of 10. The second metric may be the average of these two factors, which is 3 out of 10; this may represent that the son is experiencing some eye strain, but less than his mother, whose first metric was 4 out of 10.

In some embodiments, the media guidance application determines whether the first metric is within a first range indicating an acceptable amount of eye strain for the first viewer and whether the second metric is within a second range indicating acceptable eye strain for the second viewer. For example, if the media guidance application calculates the first and second metric on a scale from one to ten, the range indicating an acceptable amount of eye strain for the mother may be from one to three, and the range indicating an acceptable amount of eye strain for the son may be from zero to one. The media guidance application may determine that the first metric, representing the mother's degree of eye strain, is not within the range indicating an acceptable amount of eye strain for the mother, because four is outside of the range of one to three. The media guidance application may further determine that the second metric, representing the son's degree of eye strain, is not within the range indicating an acceptable amount of eye strain for the son, because three is outside of the range of zero to one.

The media guidance application may use different ranges for different viewers because some viewers, e.g., those with poorer eyesight or those who routinely experience eye fatigue, may routinely experience eye strain that cannot be adequately corrected by adjusting the display settings, or would require extreme adjustments that would not be suitable for all viewers. The range for a viewer can vary over time based on changes in the viewer's eye activity and eye strain, and/or changes in the viewer's preferences. Alternatively, the media guidance application may use the same range for all viewers, to ensure that all viewers are comfortable.

In some embodiments, to determine whether the first metric is within the first range indicating an acceptable amount of eye strain for the first viewer, the media guidance application retrieves a plurality of values that indicate the first range indicating an acceptable amount of eye strain for the first viewer, compares the first metric with each of the plurality of values that indicate the first range indicating an acceptable amount of eye strain for the first viewer, and determines, based on the comparing, that the first metric is not within the first range. These values may be stored in a database that associates an identifier of each viewer with a range, and the media guidance application may look up the range for a particular viewer based on the identifier of that viewer. For example, to determine whether the first metric, representing the mother's degree of eye strain, is within the first range, the media guidance application first retrieves from a database a plurality of values, e.g., 1 and 3, which indicate the first range indicating an acceptable amount of eye strain for the mother. The media guidance application may then compare the first metric (which was calculated to be 4) to the first of the two values (1), and determine that 4 is not less than 1, which represents the lower end of the first range. The media guidance application may then compare the first metric (4) to the second of the two values (3), and determine that 4 is greater than 3, which represents the upper end of the first range. Because the first metric (4) is greater than the upper end of the range (3), the media guidance application determines that the first metric is not within the first range.

In some embodiments, in response to determining that the first metric is not within the range indicating an acceptable amount of eye strain for the first viewer, or that the second metric is not within the range indicating an acceptable amount of eye strain for the second viewer, the media guidance application identifies, for the first viewer, a first subset of display settings that are known to cause the first metric to be within the first range and, for the second viewer, a second subset of display settings that are known to cause the second metric to be within the second range. For example, in response to determining that the first metric representing the mother's degree of eye strain is not within the range indicating an acceptable amount of eye strain for the mother, and/or that the second metric representing the son's degree of eye strain is not within the range indicating an acceptable amount of eye strain for the son, the media guidance application may determine two subsets of display settings. The first subset of display settings may be known to cause the first metric, representing the mother's degree of eye strain, to be within the first range (e.g., between 1 and 3). For example, the first subset of display settings may include a set of display settings with a larger font, so that the mother no longer must squint to see the content. The second subset of display settings may be known to cause the second metric, representing the son's degree of eye strain, to be within the second range (e.g., between 0 and 1). For example, the second subset of display settings may include a set of display settings with a lower brightness level, to reduce the eye fatigue experienced by the son.

The subsets of display settings may include one or more of any of the types of display settings described above with respect to FIG. 1. The media guidance application may select a subset of display settings based on the eye activity detected for a viewer. For example, if the media guidance application detects that the mother is squinting, this may indicate that the current display setting for the font size is too small, so the media guidance application may identify a subset of display settings with a larger font size. If each viewer is experiencing a different type of eye strain, and changing different settings would alleviate the strain for different viewers, the media guidance application may provide subsets of display settings for each viewer relating to all of identified display settings that could alleviate the strain for the viewers. For example, if the mother is squinting and the son is experiencing fatigue, and the squinting can be alleviated by changing the font size and the fatigue can be alleviated by changing the brightness, then both the first and second subsets of display settings may include both font size and brightness level.

In some embodiments, to identify the first subset of display settings that are known to cause the first metric to be within the first range, the media guidance application detects that the first viewer started consuming content from the device with a given display setting; calculates, for the first viewer, based on the eye activity of the first viewer, a starting metric that measures a degree of eye strain of the first viewer; calculates a plurality of additional metrics while the first viewer is consuming content from the device; and, in response to determining that each metric of the plurality of additional metrics is within the first range indicating an acceptable amount of eye strain for the first viewer, stores the given display setting as a display setting in the subset of display settings that are known to cause the first metric to be within the first range. For example, the media guidance may detect that the mother started consuming content from the television with a first font size. The media guidance application may calculate for the mother, based on her eye activity (e.g., blinking frequency and squinting frequency), a starting metric of 2 that measures the mother's eye strain. The media guidance application may continue to calculate additional metrics while the mother continues watching television, and may determine that each of the additional metrics is within the first range indicating an acceptable amount of eye strain for the mother. The media guidance application may store the font size as a display setting in the subset of display settings that are known to cause the first metric representing the mother's degree of eye strain to be within the first range. This way, when the media guidance application determines that the mother's eye strain metric is not within the first range, the media guidance application may identify a subset of display settings that includes the font size that was previously stored as causing an acceptable amount of eye strain.

In some embodiments, to identify the first subset of display settings that are known to cause the first metric to be within the first range, the media guidance application transmits a query comprising an identifier of the first viewer to a database, wherein the database associates the identifier of the first viewer to a plurality of settings that are known to cause the first metric to be within the first range. The media guidance application receives from the database one or more settings of the plurality of settings that are known to cause the first metric to be within the first range, and stores the one or more settings as the first subset of display settings. For example, the media guidance application may transmit a query that includes an identifier of the mother (e.g., a user ID used by the mother) to a database. The database associates the user ID of the mother to a plurality of settings (e.g., settings for font sizes that the mother can read, and settings for brightness that are acceptable to the mother) that are known to cause the first metric representing the mother's degree of eye strain to be within the first range representing an acceptable amount of eye strain for the mother. The media guidance application may receive from the database one or more settings of the plurality of settings (e.g., two font sizes and three brightness levels) and store these received settings as the first subset of display settings. This database may be the same database that stores the first and the second range, or it may be a separate database.

In some embodiments, the media guidance application identifies a third subset of display settings wherein the third subset of display settings comprises display settings that are in both the first subset and the second subset. For example, if the media guidance application has received subsets of display settings describing font sizes and brightness levels that cause the first and second metrics to be within the first and second ranges, respectively, the media guidance application may determine a third subset of display settings that includes the overlapping font sizes and brightness levels from the first and second subsets. For example, if the mother's subset of display settings includes font sizes 20 and 24 and brightness levels 1, 2, and 3, and the son's subset of display settings includes font sizes 14, 18, 20, and 24, and brightness levels 1 and 2, the third subset of display settings may include font sizes 20 and 24, and brightness levels 1 and 2.

The third subset may include all display settings that are included in the first subset and the second subset. Alternatively, the third subset may include a portion of the display settings that are included in the first and the second subset. For example, the third subset may include the portion of display settings that are most similar to the current display settings, or the third subset may remove the display settings that are at the edge of a range of display settings that are included in the first and second subset. For example, if the first subset includes font sizes 6 to 30, and the second subset includes font sizes 10 to 24, the overlapping subset includes font sizes 10 to 24. The third subset may include all font sizes from 10 to 24, or it may include font sizes 12 through 22 (removing the edges), font sizes 12 to 24 (removing the smallest font size), or any other subset of font sizes 10 to 24. The third set may include a single display setting, or a single set of different types of display settings (e.g., one font size and one brightness), or a mix of single display settings and ranges (e.g., one font size and three brightness levels).

In some embodiments, to identify the third subset of display settings, the media guidance application retrieves, from a database, the first subset of display settings and the second subset of display settings. This may be the same database that associates the identifier of the first viewer to a plurality of settings that are known to cause the first metric to be within the first range, as described above. The media guidance application then compares each display setting in the first subset of display settings to each display setting in the second subset of display settings, and store each matching display setting in the third subset of display settings. For example, the media guidance application may retrieve from a database the first subset of display settings (e.g., font sizes 20 and 24 and brightness levels 1, 2, and 3) and the second subset of display settings (e.g., font sizes 14, 18, 20, and 24, and brightness levels 1 and 2). The media guidance application may compare each display setting in the first subset of display settings to the corresponding display settings in the second subset of display settings. For example, the media guidance application may compare the font sizes 20 and 24 to font sizes 14, 18, 20, and 24, and determine that font sizes 20 and 24 are within both the first subset and second subset. The media guidance application may similarly compare the brightness levels in the first subset and second subset and determine that brightness levels 1 and 2 are on both subsets. The media guidance application may then store the matching settings (e.g., font sizes 20 and 24 and brightness levels 1 and 2) in the third subset of display settings.

In some embodiments, the media guidance application selects a second display setting that is within the third subset. For example, if the third subset of display settings includes font sizes 20 and 24 and brightness levels 1 and 2, the media guidance application may select a display setting with font size 20 and brightness 2. In some embodiments, the media guidance application selects a setting that has been selected in the past and is known to cause the first viewer's eye strain and the second viewer's eye strain to be within the ranges indicating an acceptable amount of eye strain for the first viewer and the second viewer. For example, the media guidance application may determine that the display setting with font size 20 and brightness level 2 has been selected in the past when the mother and son were viewing the television, and that this display setting caused the mother's eye strain and the son's eye strain to be within the ranges indicating an acceptable amount of eye strain for the mother and the son.

The media guidance application may select the display setting that is most similar to the current display setting. This may provide the most gradual change in the display 100 to the viewers, and would allow the media guidance application to continue changing the display setting as required, if one or more viewers' eyes are still straining. The media guidance application may alternatively select a midpoint within the range. Alternatively, the media guidance application may select a display setting that is dissimilar to the current display setting, to provide the greatest alleviation of eye strain.

In some embodiments, the media guidance application generates for display the content according to the second display setting. For example, the media guidance application may generate the program listings display with a font size of 20 and a brightness level of 2 for display.

FIG. 2 shows an illustrative example of a display 200 generated by a media guidance application according to a second display setting, in accordance with some embodiments of the disclosure. As shown in FIG. 2, the text 206 in the grid of program listings 202 has a larger font than the text 106 in the grid of program listings 102 in FIG. 1. The font sizes for the text in time and date region 208 and information region 210 are also larger than the corresponding regions 108 and 110 in FIG. 1. This indicates that the media guidance application has generated the display 200 according to a display setting that sets the font size larger than the first display setting, used for generating display 100. In addition, the image in the video region 212 is larger than the image in the video region 112, indicating that the media guidance application has zoomed in on this image by changing the zoom display setting for this region 212. The media guidance application may alternatively or additionally adjust other display settings, such as brightness, contrast, and color settings, according to the second display setting.

After generating the program listings display 200, the media guidance application may continue calculating the eye strain metrics for the viewers in order to determine whether the metrics are within the ranges of acceptable degrees of eye strain for the viewers. If the media guidance application determines that one or more metrics are not within a range of acceptable degree or eye strain for a viewer, the media guidance application may again adjust the display settings, as described above.

In some embodiments, in response to determining that generating for display the content according to the second display setting caused the first viewer's eye strain to be within the first range and the second viewer's eye strain to be within the second range, the media guidance application associates the second settings with the combination of the first viewer and the second viewer. For example, in response to determining that generating the program listings display with a font size of 20 and a brightness level of 2 caused the mother's and the son's eye strain to return to the first and second ranges indicating acceptable degrees of eye strain for the mother and son, respectively, the media guidance application associates this font size and brightness level with the viewing combination of the mother and the son. The media guidance application may store this setting in a database and associate it with an identifier of both the mother and the son, indicating that it was acceptable for that pair of viewers. Alternatively, the media guidance application may store one entry in the database linking the mother to the setting, and a second entry in the database linking the setting to the son. If the media guidance application detects that the mother and the son are consuming content at a later time, the media guidance application may automatically adjust the display setting according to the setting stored in the database.

In some embodiments, the media guidance application detects that the first viewer started consuming content from the device and calculates, based on the eye activity of the first viewer, a historical metric that represents an acceptable degree of eye strain of the first viewer. The media guidance application further determines the first range indicating an acceptable degree of eye strain for the first viewer based on the historical metric. For example, the media guidance application may detect that the mother started watching the television and calculates, based on the mother's eye activity, a historical metric that represents an acceptable degree of eye strain for the mother based on the historical metric. For example, the media guidance application may determine that historically, an acceptable degree of eye strain for the mother may be an eye strain metric of 3, based on previous eye strain metrics measured for the mother. The media guidance application may determine the first range of 1 to 3 indicating an acceptable degree of eye strain for the mother based on the historical metric of 3. A historical metric may be based on the eye strain metrics that have been previously been measured for a viewer, e.g., the most common metrics measured for that viewer. Alternatively or additionally, the historical metric may be based on an eye strain metric that a viewer has indicated represents and acceptable degree of eye strain for that viewer.

FIG. 3 shows a block diagram of an illustrative system 300 for detecting eye strain, in accordance with some embodiments of the disclosure. The system 300 includes a processor 302, a camera 304, and an eye activity sensor 306. The system 300 is observing two viewers, User 1 308 and User 2 310. Although two viewers are shown in FIG. 3, the system 300 may be capable of detecting eye activity of more than two viewers. Alternatively, a separate system for detecting eye strain may be required for each viewer.

The processor 302 may analyze data captured by the camera 304 and/or the eye activity sensor 306 to, for example, measure eye activity and/or identify viewers, as described below. The processor 302 may implement the media guidance application, or the processor 302 may implement a portion of the media guidance application. Alternatively, the processor 302 may be in communication with hardware implementing the media guidance application, and the processor 302 may transmit data to the media guidance application for use by the media guidance application. Such data may include video or image data, data identifying one or more viewers, and/or data describing eye activity. The processor 302 may receive instructions from the media guidance applications, e.g., to measure or collect data. The processor 302 may be similar to the processing circuitry described with respect to FIG. 6. The processor 302 may include communications circuitry for receiving data from the camera 304 and/or eye activity sensor 306, and/or communicating with hardware implementing the media guidance application.

The camera 304 may capture images or video of User 1 and User 2. The images or video may be transmitted to the processor 302, which may determine the identity of User 1 and User 2 based on, e.g., facial recognition. Alternatively, the processor 302 may transmit the images or data to the media guidance application, which identifies User 1 and User 2. The camera 304 may additional or alternatively capture images or video used to detect eye activity at the processor 302. For example, the processor 302 may determine the location of eyes of User 1 and User 2, and the camera 304 may take images or video focused on the eyes of User 1 and User 2. The system 300 may include multiple cameras, e.g., one focused on User 1 and one focused on User 2 210. The system 300 may track only one eye for each viewer; in this case, the system may include one camera 304 to track one eye of User 1 and another camera 304 to track one eye of User 2. The camera(s) 304 transmit the image or video data to the processor 302, which analyzes the data to detect, e.g., an amount that a user is blinking, an amount that a user is squinting, the user's pupil diameter, the velocity of the user's eye movements, and/or the speed of the user's pupil accommodation.

The system 300 may additionally or alternatively include one or more eye activity sensors 306. The eye activity sensor 306 may be an integrated piece of equipment that directly detects one or more types of eye activity. For example, the eye activity sensor 306 may be able to focus on an eye of User 1 and/or User 2 and detect, for example, blinking, by registering fast movements or color changes within the eye area. The eye activity sensor 306 may outputs data indicating, e.g., a blink or a squint, which is then processed by processor 302 to determine an amount of blinking or squinting. In some embodiments, the eye activity sensor 306 may include a camera and process in real time the images captured to measure any eye activity that is visually observed. The system 300 may include multiple eye sensors 306 for monitoring different users, different eyes, and/or different types of eye activity.

The system 300 or some elements of the system 300 may be located nearer to User 1 and/or User 2. For example, User 1 and User 2 may wear equipment, such as glasses, that include a camera 304 and/or eye activity sensors 306. The processor 302 may be integrated into equipment worn by the users, or the processor 302 may be located remotely and the equipment may be in wired or wireless communication with processor 302. Alternatively, the system 300 may be located in the direction of gaze of User 1 and User 2; for example, the system 300 may be integrated into hardware displaying displays 100 and 200, or may be located near the display hardware. If User 1 and User 2 wear equipment that incorporates the camera 304 and/or eye activity sensors 306, this may improve the quality of the metrics; however, this arrangement may be less comfortable or convenient for the viewers.

In some embodiments, the system 300 performs best if the position of the viewers' heads are fixed or relatively stable. In other embodiments, the system 300 is configured to account for viewers' head movement, which allows the viewers a more natural viewing experience than if the viewers' head were fixed in a particular position. In some embodiments accounting for the viewers' head movement, the system 300 includes two or more cameras 304. For example, two cameras may be arranged to form a stereo vision system for obtaining a 3D image of the viewers or one or more eyes; this allows processor 302 to compensate for head movement when measuring eye activity. The two or more cameras 304 may be part of a single unit or may be separate units.

In some embodiments, the system 300 or the media guidance application may transmit data describing the viewers' eye activity, such as the first and second metric, to another party. The data may be used for purposes other than adjusting the display settings. For example, the data may be used by a content provider or an advertiser, who may be interested in the effects of content or advertisements on viewers' eye activity. The content provider or advertiser may then adjust their content or advertisements according to the eye activity. The data could be used by any other interested party, such as television manufacturers or researchers, to study how viewers' eye activity responds to visual stimuli and display settings.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 5:
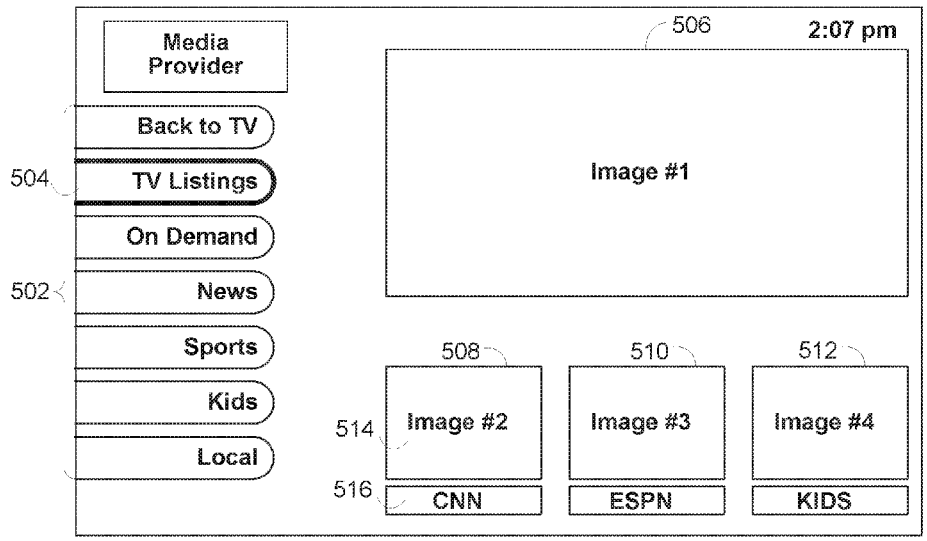
FIG. 5 shows another illustrative example of a display screen generated by a media guidance application, in accordance with some embodiments of the disclosure.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
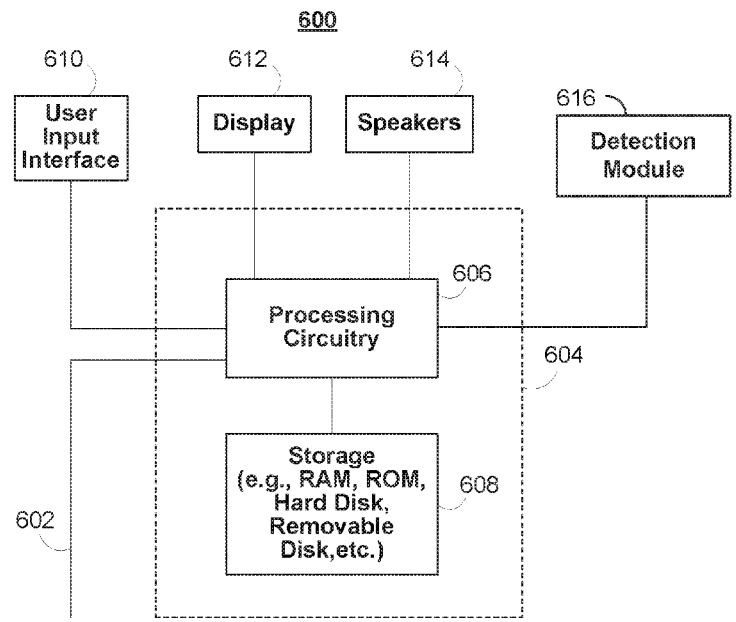
FIG. 6 is a block diagram of an illustrative user equipment device, in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 600 may also incorporate or be accessible to detection module 616. Detection module 616 may further include various components (e.g., a video detection component, an audio detection component, etc.). In some embodiments, detection module 616 may include components that are specialized to generate particular information.

For example, as discussed above in relation to FIG. 3, detection module 616 may include an eye activity detection component, which tracks one or more viewers' eyes and measures one or more types of eye activity, including squinting, blinking, pupil diameter, eye movement velocity, and/or speed of pupil accommodation. These eye activities can be symptoms that the viewer is experiencing eye strain.

In some embodiments, the eye movement detection component may include a camera. The images captured by the camera may be used to identify the viewers. Alternatively or additionally, the images captured by the camera may be analyzed to determine one or more types of eye activity. In some embodiments, the eye contact detection component includes a processor for determining the identity of the viewer and/or for analyzing the images to measure eye activity. The eye activity detection component may be integrated with other elements of user equipment device 600, or the eye contact detection component, or any other component of detection module 616 and may be a separate device or system in communication with user equipment device 600.

Figure 7:
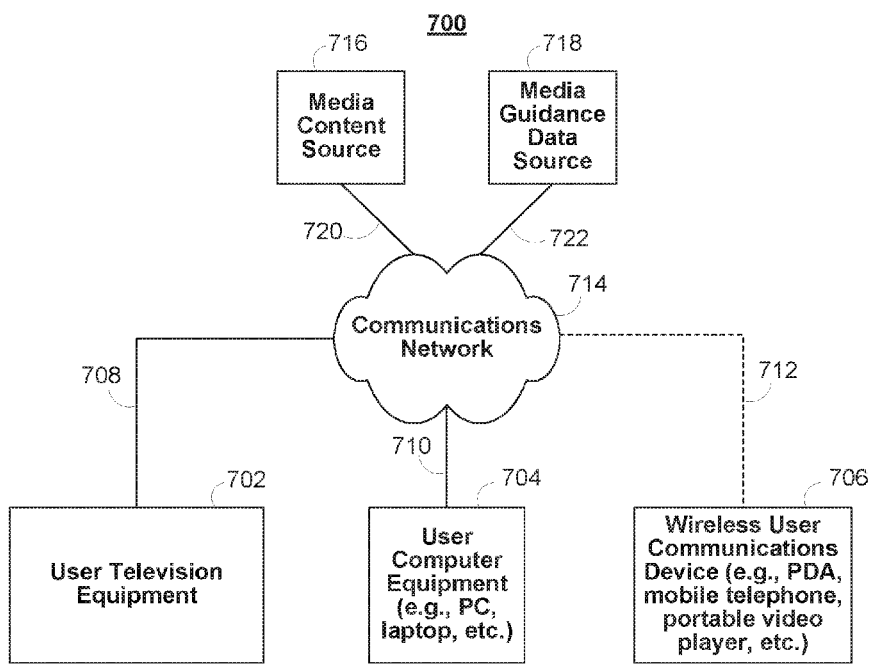
FIG. 7 is a block diagram of an illustrative media system, in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
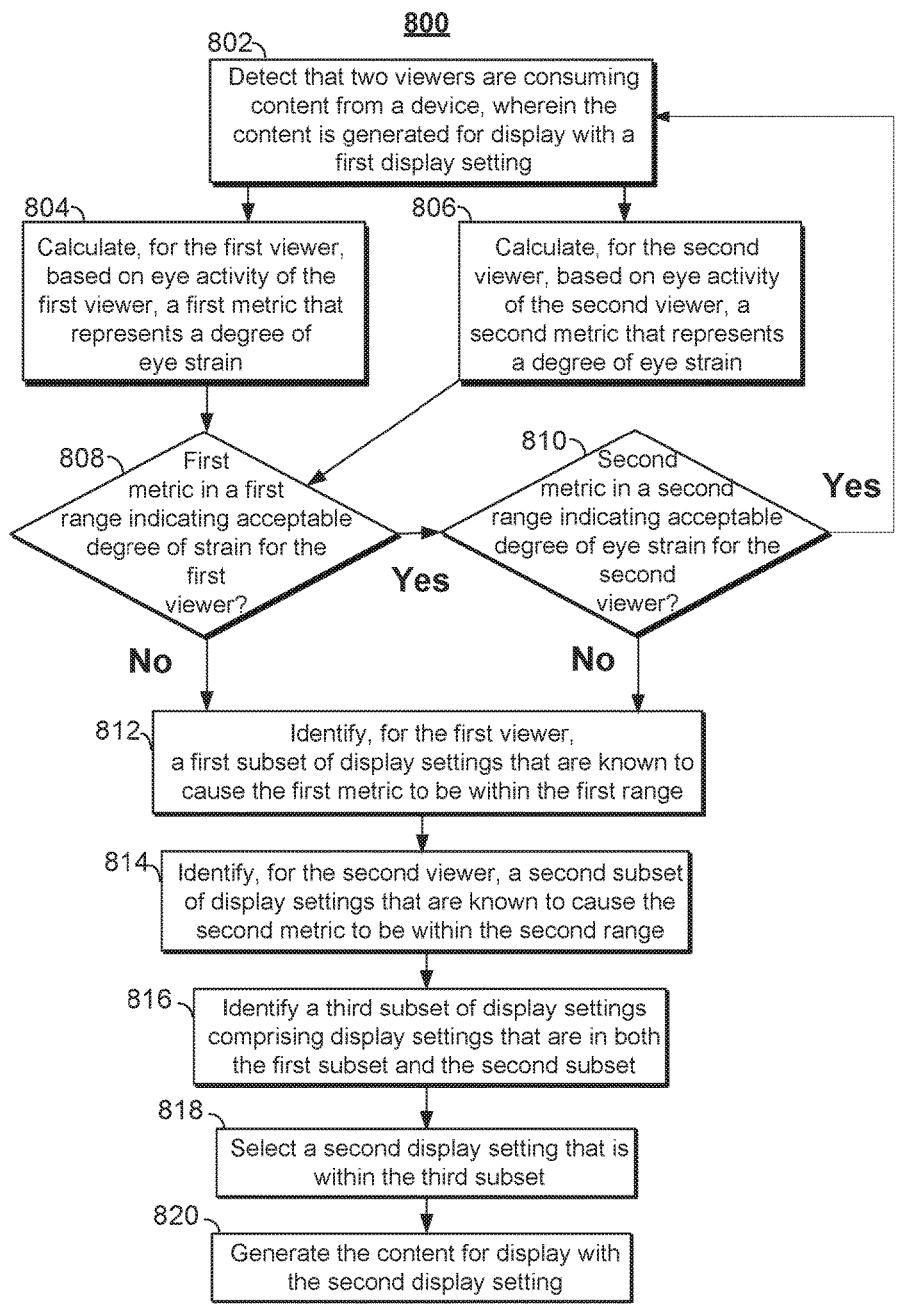
FIG. 8 is a flowchart of illustrative steps involved in reducing eye strain for multiple users, in accordance with some embodiments of the disclosure.

FIG. 8 is a flowchart of illustrative steps involved in reducing eye strain for multiple users, in accordance with some embodiments of the disclosure. The flowchart in FIG. 8 describes a process 800 implemented on control circuitry (e.g., control circuitry 604). The control circuitry 604 may be acting under commands from the media guidance application, as described above. The elements of process 800 may be performed at control circuitry 604, detection module 616, or a combination of devices. In some embodiments, an algorithm for process 800 may be encoded on to non-transitory storage medium (e.g., storage device 608) as a set of instructions to be decoded and executed by processing circuitry (e.g., processing circuitry 606). Processing circuitry may, in turn, provide instructions to other sub-circuits contained within control circuitry 604, such as video generating, encoding, decoding, encrypting, decrypting, scaling, analog/digital conversion circuitry, and the like.

At 802, control circuitry 604 detects that two viewers are consuming content from a device, wherein the content is generated for display according to a first display setting. Generating content for the display 100 with a first display setting is described with respect to FIG. 1. Various types of display settings that may be used in generating the display are also described with respect to FIG. 1. Detecting that two viewers, such as User 1 and User 2 of FIG. 3, are consuming content from a device (e.g., the device displaying display 100) is described with respect to FIG. 1 and FIG. 3.

At 804, control circuitry 604 calculates, for the first viewer (e.g., User 1 in FIG. 1), based on the eye activity of the first viewer, a first metric that represents a degree of eye strain. At 806, control circuitry calculates, for the second viewer (e.g., User 2 in FIG. 3), based on eye activity of the second viewer, a second metric that represents a degree of eye strain. Calculating a metric representing a degree of eye strain based on eye activity of a viewer is described with respect to FIG. 1 and FIG. 3. Calculating a metric representing a degree of eye strain based on eye activity of a viewer is also shown and described in further detail with respect to FIG. 9.

At 808, control circuitry 604 determines whether a first metric in a first range indicating an acceptable degree of eye strain for the first viewer (e.g., User 1). Determining whether a metric is in a range indicating an acceptable degree of eye strain for a viewer is described with respect to FIG. 1, and is also shown and described in greater detail with respect to FIG. 10. If the first metric is in not a first range indicating an acceptable degree of eye strain for the first viewer, the process proceeds directly to 812. If the first metric is in a first range indicating an acceptable degree of eye strain for the first viewer, the process proceeds to decision 810.

At 810, control circuitry 604 determines whether a second metric in a second range indicating an acceptable degree of eye strain for the second viewer (e.g., User 2). Determining whether a metric is in a range indicating an acceptable degree of eye strain for a viewer is described with respect to FIG. 1, and is also shown and described in greater detail with respect to FIG. 10. If the first metric is in not a first range indicating an acceptable degree of eye strain for the first viewer, the process proceeds to 812. If the first metric is in a first range indicating an acceptable degree of eye strain for the first viewer, the process may return to 802, and continue monitoring for viewers and monitoring their eye activity until an unacceptable degree of eye strain is detected. Alternatively, the process may pause and resume after a period of time, e.g., 5 minutes or 15 minutes, to check whether either viewer has begun experiencing eye strain.

At 812, control circuitry 604 identifies, for the first viewer (e.g., User 1), a first subset of display settings that are known to cause the first metric to be within the first range. At 814, control circuitry 604 identifies, for the second viewer (e.g., User 2), a second subset of display settings that are known to cause the second metric to be within the second range. Identifying a subset of display settings that are known to cause a metric to be within a viewer's range indicating an acceptable degree of eye strain is described with respect to FIG. 1, and is also shown and described in greater detail with respect to FIG. 10.

At 816, control circuitry 604 identifies a third subset of display settings comprising display settings that are in both the first subset and the second subset. This third subset of display settings should cause both the first metric to be within the first range and the second metric to be within the second range. Identifying the third subset of display settings is described with respect to FIG. 1.

At 818, control circuitry 604 selects a second display setting that is within the third subset. At 820, control circuitry 604 generates for display the content according to the second display setting. For example, as shown in FIG. 2, control circuitry 604 generates display 200 according to the second display setting. Selecting a second display setting and generating the content for display according to the second display setting are described with respect to FIGS. 1 and 2.

Figure 9:
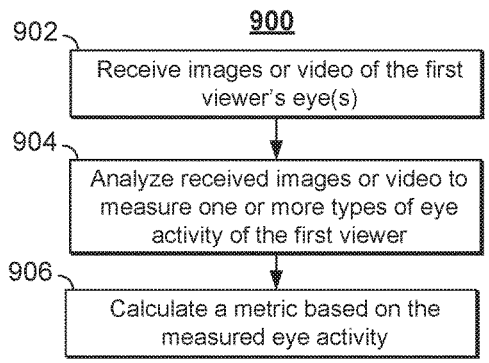
FIG. 9 is a flowchart of illustrative steps involved in calculating an eye strain metric for a viewer, in accordance with some embodiments of the disclosure.

FIG. 9 is a flowchart of illustrative steps involved in calculating an eye strain metric for a viewer, in accordance with some embodiments of the disclosure. The illustrative steps are described with respect to the first viewer, but a similar process may be performed for the second viewer or any other viewer. The flowchart in FIG. 9 describes a process 900 implemented on control circuitry (e.g., control circuitry 604). The control circuitry 604 may be acting under commands from the media guidance application, as described above. The elements of process 900 may be performed at control circuitry 604, detection module 616, or a combination of devices. In some embodiments, an algorithm for process 800 may be encoded on to non-transitory storage medium (e.g., storage device 608) as a set of instructions to be decoded and executed by processing circuitry (e.g., processing circuitry 606). Processing circuitry may, in turn, provide instructions to other sub-circuits contained within control circuitry 604, such as video generating, encoding, decoding, encrypting, decrypting, scaling, analog/digital conversion circuitry, and the like.

At 904, control circuitry 604 receives images or video of either one or both eyes of the first viewer. Control circuitry 604 may receive the images or video from the detection module 616, which may be implemented as system 300, described with respect to FIG. 3. For example, control circuitry 604 may receive images or video from camera 304. Control circuitry 604 may store, e.g., in storage 608, the received images or video for processing. While process 900 is described as being performed by control circuitry 604, it should be understood that processor 302 may receive images or video from camera 304, and processor 302 may perform some or all of process 900, alone or in conjunction with processor 604.

At 904, control circuitry 604 analyzes the received images or video to measure one or more types of eye activity. For example, as described with respect to FIG. 1, control circuitry 604 may analyze the images or video to measure one or more eye characteristics or movements. These measurements may be used to calculate the eye strain metric, as described above. For example, control circuitry 604 may analyze a video to determine an amount of blinking of the first viewer, e.g., the number of times that the viewer's eye(s) blink during a time period, or the frequency with which the viewer's eye(s) blink. Control circuitry 604 may perform image processing to determine when the viewer's eyelid is closed, or may use motion detection to determine when the viewer's eyelid is moving quickly upward and/or downward.

As another example, control circuitry 604 may measure a pupil diameter of the first viewer by assessing the distance across of the black circle in the center of the viewer's eye(s), which control circuitry 604 may detect using image processing. Control circuitry 604 may measure a single measurement of pupil diameter in a single image, or control circuitry 604 may take multiple measurements of the viewer's pupil diameter and then calculate, e.g., an average pupil diameter, or a range of pupil diameter. Control circuitry 604 may additionally or alternatively receive data relating to the brightness of display 100, and control circuitry 604 may calculate a measurement or metric that compares the pupil diameter (at a given time or over a period of time) to the brightness of display 100.

As another example, control circuitry 604 may measure an amount of squinting of the first viewer by performing image or video processing. Control circuitry 604 may measure the number of times that the viewer squints, the length of the viewer's squints, and/or the amount of time during a given time period that the viewer is squinting. Control circuitry 604 may perform image processing to determine when the viewer's eye(s) are squinting (e.g., by measuring the height of the viewer's eye opening relative to a non-squinting height, by measuring an amount of eye wrinkles relative to a non-squinting amount of eye wrinkles), or may use motion detection to determine when the viewer's eyelid are moving into a squinting position.

As another example, control circuitry 604 may measure an eye movement velocity of the first viewer. For example, control circuitry 604 may perform motion detection to determine how fast the viewer's eye(s) are moving, e.g., by tracking the viewer's pupil(s). Control circuitry 604 may measure an average velocity, or may measure the eye movement velocity at different points in time and calculate, e.g., an average, maximum, or minimum eye movement velocity over a given time period.

As another example, control circuitry 604 may measure a speed of pupil accommodation of the first viewer by, e.g., analyzing a video to detect the speed at which the diameter of the viewer's pupil(s) change. For example, control circuitry 604 may measure the diameter of the viewer's pupil(s) at different points in time and calculate the speed of change between the points in time as a function of change in diameter divided by time. Control circuitry 604 may measure the speed of pupil accommodation based on triggers, such as changes to the content or brightness of display 100. Control circuitry 604 may calculate an average, maximum, or minimum speed of pupil accommodation during a given time period.

Control circuitry 604 may assess a video or a set of images received from camera 304 over a particular time period to measure any of the above-described movements or features. Control circuitry 604 may compare any of the above-described measurements to similar measurements taken at earlier periods of time to determine whether the measurements have changed. As discussed with respect to FIG. 3, control circuitry 604 may receive one or more eye activity measurements directly from eye activity sensor 306 rather than measure the eye activity measurements.

At 906, control circuitry 604 calculates a metric based on the measured eye activity. As discussed with respect to FIG. 1, control circuitry 604 may, for example, scale an eye activity measurement according to a scaling guideline or formula. If multiple eye activities are measured, each eye activity measurement may be considered an eye strain factor (or control circuitry 604 may scale each eye activity measurement to generate an eye strain factor), and control circuitry 604 may combine these eye strain factors using any algorithm or formula. For example, as described above, control circuitry may calculate, e.g., an average of the eye strain factors, a weighted average of the eye strain factors, or some other function or formula that receives the eye strain factors as inputs and calculates the first metric. Alternatively, the media guidance application may select an eye strain factor, such as the highest scaled eye strain factor, and set the first metric equal to the selected eye strain factor. In some embodiments, the measured eye activity may be used as the metric, without any scaling or calculation.

For example, control circuitry 604 may calculate the metric by scaling or rating any of the eye activity measurements described above. As an example, control circuitry 604 may rate an eye activity measurement on a scale from 1 to 10, based on a rating scale which may be stored on storage device 608. A low number may indicate that the eye activity measurement is generally associated with little or no eye strain, and a higher number may indicate that the eye activity measurement is generally associated with a higher degree of eye strain. As another example, control circuitry 604 may perform a mathematical function on the eye activity measurement to calculate an eye strain metric, e.g., by multiplying or dividing the eye activity measurement by a given number, squaring the eye activity measurement, etc. The function performed on the eye activity measurement may be tailored to the viewer, e.g., to account for a viewer's baseline eye activity measurement, such as measurements of blinking speed, squinting, pupil accommodation velocity, eye movement velocity, or pupil diameter when the viewer's eyes are not straining.

Furthermore, control circuitry 604 may calculate the metric based on more than one eye activity measurements, which may be considered eye strain factors. For example, the first eye strain factor may be the number of times that the viewer blinks during a first time period (e.g., 15 times over one minute), and the second eye strain factor may be the level of squinting (e.g., squinting during 40% of the minute). Control circuitry 604 may then calculate the first metric for the viewer based on the number of times that the viewer blinks (i.e., a blinking factor) and the amount of time that the viewer is squinting (i.e., a squinting factor). For example, control circuitry 604 may first scale both the blinking factor and the squinting factor based on the severity of these symptoms, and then control circuitry 604 ion may average the two factors to calculate the first metric. For example, squinting during 40% of the minute may be 8 out of 10 on a scale of squinting severity, because it represents a fairly high amount of squinting. Blinking 15 times during one minute may be 0 out of 10 on a scale of blinking severity, because blinking 15 times over one minute is a normal amount of blinking. The first metric, which is the average of these two factors, is 4 out of 10, which may represent that the viewer is straining her eyes a moderate amount.

Figure 10:
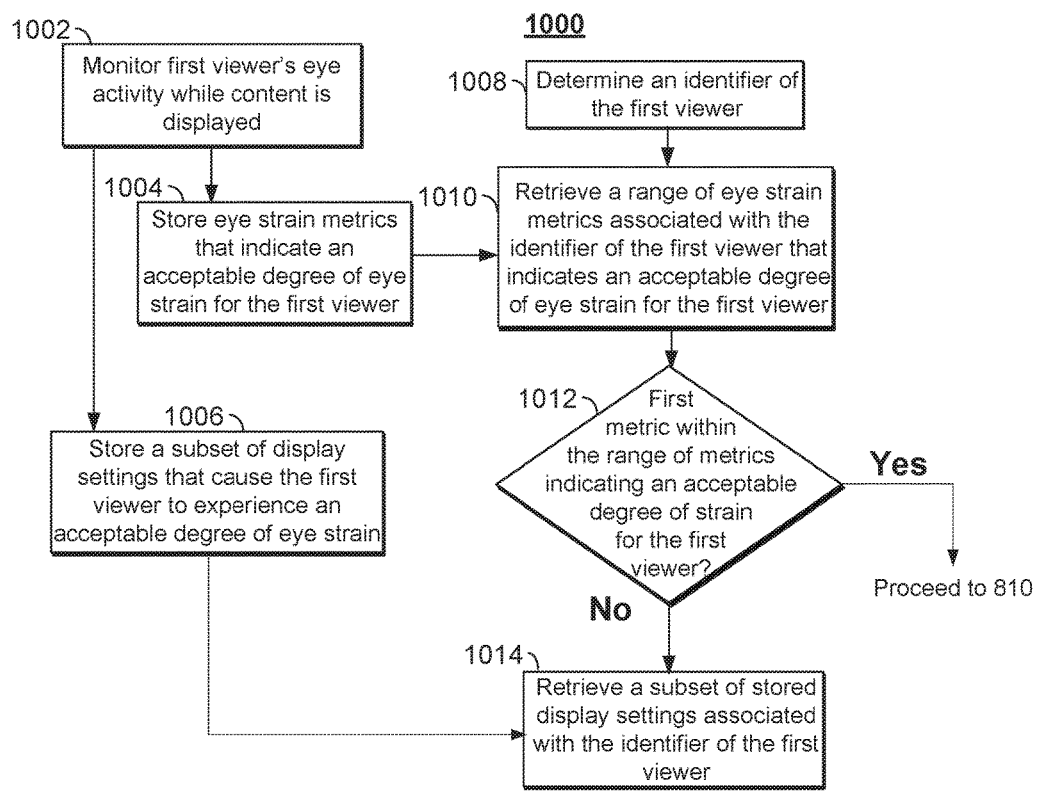
FIG. 10 is a flowchart of illustrative steps involved in determining whether a metric is within a range of acceptable eye strain for a viewer, and identifying a subset of display settings that are known to cause the metric to be within the range of acceptable eye strain, in accordance with some embodiments of the disclosure.

FIG. 10 is a flowchart of illustrative steps involved in determining whether a metric is within a range of acceptable eye strain for a viewer, and identifying a subset of display settings that are known to cause the metric to be within the range of acceptable eye strain, in accordance with some embodiments of the disclosure. The illustrative steps are described with respect to the first viewer, but a similar process may be performed for the second viewer or any other viewer. The flowchart in FIG. 10 describes a process 1000 implemented on control circuitry (e.g., control circuitry 604). The control circuitry 604 may be acting under commands from the media guidance application, as described above. The elements of process 1000 may be performed at control circuitry 604, detection module 616, or a combination of devices. In some embodiments, an algorithm for process 800 may be encoded on to non-transitory storage medium (e.g., storage device 608) as a set of instructions to be decoded and executed by processing circuitry (e.g., processing circuitry 606). Processing circuitry may, in turn, provide instructions to other sub-circuits contained within control circuitry 604, such as video generating, encoding, decoding, encrypting, decrypting, scaling, analog/digital conversion circuitry, and the like.

At 1002, control circuitry 604 monitors a first viewer's eye activity while content is displayed at various display settings. The monitoring may be similar to process 900, described above. Control circuitry 604 may monitor the first viewer's eye activity while the first viewer views display 612. For example, control circuitry 604 may implement a display setting configuration test with the first viewer, in which control circuitry 604 generates displays of content with various different display settings and observes the first viewer's eye activity under the different display settings. In some embodiments, control circuitry 604 may receive feedback from the first viewer indicating, for example, whether the display settings are comfortable for the viewer, how comfortable the viewer is with the display settings, whether and to what degree the viewer is straining to see the display, any modifications to the display settings that the viewer would prefer, etc. Alternatively, or in addition, control circuitry 604 may monitor the first viewer's eye activity in a background mode while the first viewer consumes content on display 612. Control circuitry 604 may note any manual changes the first viewer makes to the display settings.

At 1004, control circuitry 604 stores eye strain metrics that indicate an acceptable degree of eye strain for the first viewer. For example, control circuitry 604 may store eye strain metrics that are most commonly detected for the first viewer. Control circuitry 604 may store eye strain metric that are detected for the first viewer over a long period of time, without the first viewer adjusting the display settings. Control circuitry 604 may store eye strain metrics that are detected after the first viewer adjusts the display settings. If control circuitry 604 performs the display setting configuration test described with respect to 1002, control circuitry 604 may store the eye strain metrics corresponding to the times when the first viewer indicated that his eyes were comfortable and not straining. Any of these metrics may be stored in a database associating an identifier for the first viewer with the eye strain metrics indicating an acceptable degree of eye strain. The database may store a range of eye strain metrics (e.g., the highest calculated eye strain metric deemed acceptable, and the lowest eye strain metric deemed acceptable), or the database may store a plurality of eye strain metrics (e.g., each calculated eye strain metric that was deemed acceptable) that may be used to generate a range of eye strain metrics. The identity of the first viewer may be determined as described with respect to FIG. 1 and 1008, discussed below.

At 1006, control circuitry 604 stores a subset of display settings that cause the first viewer to experience an acceptable degree of eye strain. For example, for each of the stored eye strain metrics described with respect to 1004, control circuitry 604 may also store the display settings used by control circuitry 604 to generate an image on display 612 at the time the eye strain metric was calculated. Any of these display settings may be stored in a database associating an identifier for the first viewer with the display settings. The database may store a range of display settings (e.g., the highest acceptable brightness and the lowest acceptable brightness; the highest acceptable font size and the lowest acceptable font size, etc.), or the database may store a plurality of sets of display settings (e.g., each set of display settings that was deemed acceptable). The identity of the first viewer may be determined as described with respect to FIG. 1 and 1008, discussed below.

At 1008, control circuitry 604 determines an identifier of the first viewer. For example, described with respect to FIG. 1, control circuitry 604 may receive proximity data from devices associated with the viewers (e.g., smart phones or smart watches) identifying that the viewers are in the proximity of the display 100. As another example, the viewers may provide identifying information to control circuitry 704 by, e.g., signing in or selecting a user profile. As another example, as described with respect to FIGS. 1 and 3, control circuitry 604 and/or system 300 may perform facial recognition based on an image or video of the viewer captured by camera 604. Control circuitry 604 may associate each viewer with a particular identifier, which can be used to reference the viewer in various databases, such as databases for viewer preferences, prior eye strain metrics and/or measurements of the viewer, an acceptable degree of eye strain (or range of eye strains) for the viewer, display settings that have been known to cause an acceptable degree of eye strain for the viewer, etc.

At 1010, control circuitry 604 retrieves a range of eye strain metrics associated with the identifier of the first viewer. For example, control circuitry 604 may access or query a database on storage 608 that associates identifiers of viewers with ranges of eye strain metrics associated with the viewers. The ranges may have been developed according to the process described at 1002 and 1004. Alternatively, the range of eye strain metrics that indicate an acceptable degree of eye strain may be the same for all users, and control circuitry 604 may simply retrieve this range.

At 1012, control circuitry 604 determine whether the first metric is within the retrieved range of eye strain metrics indicating an acceptable degree of eye strain for the first viewer. For example, control circuitry 604 may determine whether the first metric is below the lower end of the range, or whether the first metric is above the higher end of the range. If the first metric is within the range of eye strain metrics indicating an acceptable degree of eye strain for the first viewer (i.e., the first viewer's eyes are not straining an unacceptable amount), the process proceeds to 810 in FIG. 8, described above. Steps 810 and 814 in FIG. 8 may be performed in a similar manner to process 1000. If the first metric is not within the range of eye strain metrics indicating an acceptable degree of eye strain for the first viewer (i.e., the first viewer's eyes are straining an unacceptable amount), the process proceeds to 1014.

At 1014, control circuitry 604 retrieves a subset of stored display settings associated with the identifier of the first viewer. For example, control circuitry 604 may access or query a database on storage 608 that associates identifiers of viewers with subsets of display settings associated with the viewers. The subset of display settings may have been developed according to the process described at 1002 and 1006.

It is contemplated that the descriptions of FIGS. 8-10 may be used with any other embodiment of this disclosure. In addition, the descriptions described in relation to the algorithms of FIGS. 8-10 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments several instances of a variable may be evaluated in parallel, using multiple logical processor threads, or the algorithm may be enhanced by incorporating branch prediction. Furthermore, it should be noted that the processes of FIGS. 8-10 may be implemented on a combination of appropriately configured software and hardware, and that any of the devices or equipment discussed in relation to FIGS. 6-7 could be used to implement one or more portions of the process.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for reducing eye strain for multiple viewers, the method comprising:

detecting that a first viewer and a second viewer are consuming content from a device, wherein the content is generated for display according to a first display setting;

calculating, for the first viewer, based on eye activity of the first viewer, a first metric that represents a degree of eye strain of the first viewer;

calculating, for the second viewer, based on eye activity of the second viewer, a second metric that represents a degree of eye strain of the second viewer;

determining whether the first metric is within a first range indicating an acceptable degree of eye strain for the first viewer and whether the second metric is within a second range indicating an acceptable degree of eye strain for the second viewer;

in response to determining that the first metric is not within the first range, or that the second metric is not within the second range:

identifying, for the first viewer, a first subset of display settings that are known to cause the first metric to be within the first range and, for the second viewer, a second subset of display settings that are known to cause the second metric to be within the second range;

identifying a third subset of display settings wherein the third subset of display settings comprises display settings that are in both the first subset and the second subset;

selecting a second display setting that is within the third subset; and generating for display the content according to the second display setting.

2. The method of claim 1, wherein calculating the first metric comprises:

measuring at least one of an amount of blinking of the first viewer, a pupil diameter of the first viewer, an amount of squinting of the first viewer, an eye movement velocity of the first viewer, and a speed of pupil accommodation of the first viewer; and storing the at least one of the amount of blinking of the first viewer, the pupil diameter of the first viewer, the amount of squinting of the first viewer, the eye movement velocity of the first viewer, and the speed of pupil accommodation of the first viewer.

3. The method of claim 1, wherein calculating the first metric comprises:

measuring a first eye strain factor of the first viewer during a first time period, wherein the first eye strain factor represents a first symptom of eye strain;

measuring a second eye strain factor of the first viewer during the first time period, wherein the second eye strain factor represents a second symptom of eye strain; and calculating the first metric based on the first eye strain factor and the second eye strain factor.

4. The method of claim 1, wherein determining whether the first metric is within the first range comprises:

retrieving a plurality of values that indicate the first range indicating an acceptable degree of eye strain for the first viewer;

comparing the first metric with each of the plurality of values that indicate the first range; and determining, based on the comparing, that the first metric is not within the first range.

5. The method of claim 1, wherein identifying, for the first viewer, the first subset of display settings that are known to cause the first metric to be within the first range comprises:

detecting that the first viewer started consuming content from the device with a given display setting;

calculating, for the first viewer, based on the eye activity of the first viewer, a starting metric, wherein the starting metric measures a degree of eye strain of the first viewer;

calculating a plurality of additional metrics while the first viewer is consuming content from the device; and in response to determining that each metric of the plurality of additional metrics is within the first range, storing the given display setting as a display setting in the subset of display settings that are known to cause the first metric to be within the first range.

6. The method of claim 1, wherein identifying, for the first viewer, the first subset of display settings that are known to cause the first metric to be within the first range comprises:

transmitting a query comprising an identifier of the first viewer to a database, wherein the database associates the identifier of the first viewer to a plurality of settings that are known to cause the first metric to be within the first range;

receiving from the database one or more settings of the plurality of settings that are known to cause the first metric to be within the first range; and storing the one or more settings as the first subset of display settings.

7. The method of claim 1, wherein identifying the third subset of display settings comprises:

retrieving, from a database, the first subset of display settings and the second subset of display settings;

comparing each display setting in the first subset of display settings to each display setting in the second subset of display settings; and storing each matching display setting in the third subset of display settings.

8. The method of claim 1, wherein selecting the second display setting that is within the third subset comprises:

selecting a setting that has been selected in the past and is known to cause the first viewer's eye strain to be within the first range and the second viewer's eye strain to be within the second range.

9. The method of claim 1, further comprising:

in response to determining that generating for display the content according to the second display setting caused the first viewer's eye strain to be within the first range and the second viewer's eye strain to be within the second range, associating the second settings with the combination of the first viewer and the second viewer.

10. The method of claim 1, further comprising:

detecting that the first viewer started consuming content from the device;

calculating, for the first viewer, based on the eye activity of the first viewer, a historical metric, wherein the historical metric represents an acceptable degree of eye strain of the first viewer; and determining the first range indicating an acceptable degree of eye strain for the first viewer based on the historical metric.

11. A system for reducing eye strain for multiple viewers, the method comprising control circuitry configured to:

detect that a first viewer and a second viewer are consuming content from a device, wherein the content is generated for display according to a first display setting;

calculate, for the first viewer, based on eye activity of the first viewer, a first metric that represents a degree of eye strain of the first viewer;

calculate, for the second viewer, based on eye activity of the second viewer, a second metric that represents a degree of eye strain of the second viewer;

determine whether the first metric is within a first range indicating an acceptable degree of eye strain for the first viewer and whether the second metric is within a second range indicating an acceptable degree of eye strain for the second viewer; and in response to determining that the first metric is not within the first range, or that the second metric is not within the second range:

identify, for the first viewer, a first subset of display settings that are known to cause the first metric to be within the first range and, for the second viewer, a second subset of display settings that are known to cause the second metric to be within the second range;

identify a third subset of display settings wherein the third subset of display settings comprises display settings that are in both the first subset and the second subset;

select a second display setting that is within the third subset; and generate for display the content according to the second display setting.

12. The system of claim 11, wherein the control circuitry is further configured to:

measure at least one of an amount of blinking of the first viewer, a pupil diameter of the first viewer, an amount of squinting of the first viewer, an eye movement velocity of the first viewer, and a speed of pupil accommodation of the first viewer; and store the at least one of the amount of blinking of the first viewer, the pupil diameter of the first viewer, the amount of squinting of the first viewer, the eye movement velocity of the first viewer, and the speed of pupil accommodation of the first viewer.

13. The system of claim 11, wherein the control circuitry is further configured to:

measure a first eye strain factor of the first viewer during a first time period, wherein the first eye strain factor represents a first symptom of eye strain;

measure a second eye strain factor of the first viewer during the first time period, wherein the second eye strain factor represents a second symptom of eye strain; and calculate the first metric based on the first eye strain factor and the second eye strain factor.

14. The system of claim 11, wherein the control circuitry is further configured to:

retrieve a plurality of values that indicate the first range indicating an acceptable degree of eye strain for the first viewer;

compare the first metric with each of the plurality of values that indicate the first range; and determine, based on the comparing, that the first metric is not within the first range.

15. The system of claim 11, wherein the control circuitry is further configured to:

detect that the first viewer started consuming content from the device with a given display setting;

calculate, for the first viewer, based on the eye activity of the first viewer, a starting metric, wherein the starting metric measures a degree of eye strain of the first viewer;

calculate a plurality of additional metrics while the first viewer is consuming content from the device; and in response to determining that each metric of the plurality of additional metrics is within the first range, store the given display setting as a display setting in the subset of display settings that are known to cause the first metric to be within the first range.

16. The system of claim 11, wherein the control circuitry is further configured to:

transmit a query comprising an identifier of the first viewer to a database, wherein the database associates the identifier of the first viewer to a plurality of settings that are known to cause the first metric to be within the first range;

receive from the database one or more settings of the plurality of settings that are known to cause the first metric to be within the first range; and store the one or more settings as the first subset of display settings.

17. The system of claim 11, wherein the control circuitry is further configured to:

retrieve, from a database, the first subset of display settings and the second subset of display settings;

compare each display setting in the first subset of display settings to each display setting in the second subset of display settings; and store each matching display setting in the third subset of display settings.

18. The system of claim 11, wherein the control circuitry is further configured to:

select a setting that has been selected in the past and is known to cause the first viewer's eye strain to be within the first range and the second viewer's eye strain to be within the second range.

19. The system of claim 11, wherein the control circuitry is further configured to:

in response to determining that generating for display the content according to the second display setting caused the first viewer's eye strain to be within the first range and the second viewer's eye strain to be within the second range, associate the second settings with the combination of the first viewer and the second viewer.

20. The system of claim 11, wherein the control circuitry is further configured to:

detect that the first viewer started consuming content from the device;

calculate, for the first viewer, based on the eye activity of the first viewer, a historical metric, wherein the historical metric represents an acceptable degree of eye strain of the first viewer; and determine the first range indicating an acceptable degree of eye strain for the first viewer based on the historical metric.

* * * * *